(12) United States Patent
Nishikawa et al.

(10) Patent No.: US 7,540,722 B2
(45) Date of Patent: Jun. 2, 2009

(54) BLOWER

(75) Inventors: Tomomasa Nishikawa, Hitachinaka (JP); Hiroto Inagawa, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 533 days.

(21) Appl. No.: 11/048,806

(22) Filed: Feb. 3, 2005

(65) Prior Publication Data

US 2005/0169782 A1    Aug. 4, 2005

(30) Foreign Application Priority Data

Feb. 3, 2004    (JP)    ............................ P2004-026713

(51) Int. Cl.
 *F04B 39/00*    (2006.01)
 *F04B 39/06*    (2006.01)
 *F04B 35/04*    (2006.01)
 *F04D 29/66*    (2006.01)

(52) U.S. Cl. .................... 417/312; 417/371; 417/423.1; 417/423.14; 415/119

(58) Field of Classification Search ................. 417/371, 417/423.1
 See application file for complete search history.

(56) References Cited

U.S. PATENT DOCUMENTS 6,283,726 B1 *  9/2001  Fackelmann et al. ........ 417/366
6,305,909 B1 * 10/2001  Jankowski et al. .......... 417/234
6,511,286 B2 *  1/2003  Miyamoto ................... 415/191
2002/0067995 A1 *  6/2002  Cifarelli ...................... 417/234

FOREIGN PATENT DOCUMENTS

JP    2002-339898    11/2002

* cited by examiner

*Primary Examiner*—Devon C Kramer
*Assistant Examiner*—Philip Stimpert
(74) *Attorney, Agent, or Firm*—Antonelli, Terry, Stout & Kraus, LLP.

(57) ABSTRACT

A blower providing a blower mode and a vacuum mode. A casing provides a motor housing installing a motor and a fan housing installing a centrifugal fan rotationally driven by the motor. A partition is disposed and having a first surface defining a motor housing and second surface defining a fan housing. The fan includes a generally circular base plate having one surface in direct confrontation with the second surface. A plurality of base plate through-holes arrayed in an imaginary circle whose center is coincident with the rotation axis of the fan are formed in the base plate. The partition is formed with a plurality of partition through-holes arrayed in the imaginary circle and in selective alignment with the base plate through-holes in accordance with the rotation of the centrifugal fan. Each partition through-hole includes a width increasing region where a width of the partition through-hole in the circumferential direction is gradually increased toward the second surface.

8 Claims, 11 Drawing Sheets

BLOWER

BACKGROUND OF THE INVENTION

The present invention relates to a blower, and more particularly, to such portable blower having a blower mode to blow away dust and the like, and a vacuum mode to suck in air to perform dust collection or the like.

The blower includes a casing formed with an inlet and an outlet and defining therein a fan housing space. A centrifugal fan including a so-called vane wheel is provided in the fan housing space. The centrifugal fan is rotatable by an electric motor for blowing out air or sucking air. The rotation of the fan simultaneously cools the motor. Upon rotation of the centrifugal fan, air is sucked into the casing through the inlet and is blown to an atmosphere through the outlet. The blower is utilized for such purposes as to blow away dusts, fallen leaves, wood chips, etc., or to suck in and collect the dusts, wood chips, etc. For blowing operation, a nozzle is attached to the outlet of the casing, whereas nothing is attached to the inlet. On the other hand, for suction operation, a dust collection bag is attached to the outlet, and a nozzle or hose is attached to the inlet.

More specifically, as shown in FIG. 18, a casing 110 is composed of a plurality of separable segments such as a mutually opposing first segment 110A and second segment (not shown), and define therein a fan housing space 110a in which a centrifugal fan 130 shown in FIG. 19 is accommodated. The first segment 110A includes a circular partition 110C defining the fan housing space 110a, and a generally cylindrical peripheral wall 110L. The centrifugal fan 130 includes a base plate 131 and multiple spiral vanes 132 projecting from one surface 131A of the base plate 131. The base plate 131 has an opposite surface 131B positioned in direct confrontation with the circular partition 110C. A plurality of through-holes 131a are formed in the base plate 131.

At the center of the partition 110C of the first segment 110A, a bearing holder 110D is provided in order to hold a bearing (not shown) which rotatably supports a rotor (not shown) of an electric motor (not shown). The centrifugal fan 130 is mounted on the rotor. Further, an outlet 112 is positioned in a tangential direction with respect to the circular partition 10C of the casing 110.

In the location which opposes the first segment 110A shown in FIG. 18, which is the location upward from the sheet of FIG. 18, the second segment (not shown) is disposed opposite to the first segment 110A. The first segment 110A and the second segment are coupled to each other at a parting face 110E. By bringing the first segment 110A and the second segment into contact with each other at the parting face 110E, the single fan housing space 110a is provided. The second segment is formed with an inlet (not shown) in order to suck air from outside the casing 110 into the fan housing space 110a.

The inlet protrudes cylindrically from the second segment in a direction upward from the sheet of FIG. 18. A nozzle or other accessories can be attached to and detached from the inlet. An electric motor housing space (not shown) is provided on the first segment 110A on the opposite side of the fan housing space 110a with respect to the partition 110C, that is, at the location downward from the sheet of FIG. 18. The electric motor (not shown) for rotating the centrifugal fan 130 is installed in the electric motor housing space. At a radially outer side of and adjacent to the bearing holder 110D, arcuate through-holes 110c are formed in the partition 110C. Each arcuate through-hole has a contour on an imaginary circle whose center is coincident with the center of the circularly shaped partition 110C. Moreover, the arcuate through holes 110c are positioned in alignment with the plurality of through-holes 131a formed in the base plate 131. The through-holes 110c, 131a provide fluid communication between the electric motor housing space and the fan housing space 110a.

In the blower, air flows into the inlet by the centrifugal force brought by the rotation of the centrifugal fan 130. The air flows from the upward location toward the downward location in the sheet of FIG. 19, which is the axial direction of the fan 130. The air enters the spaces between the neighboring vanes 132, and changes direction by roughly 90 degrees within the centrifugal fan 130, and flows in the radial direction of the centrifugal fan 130. The air flows following the inner peripheral surface of the peripheral wall 110L (FIG. 18), and finally flows out through the outlet 112. Incidentally, the second segment also has a peripheral wall complementary to the peripheral wall 110L.

In addition to this air flow, another flow path is provided for cooling the electric motor. The casing 110 is formed with another inlet (not shown) at a position near the electric motor. By the rotation of the fan 130, air is introduced into the electric motor housing space through the other inlet, and passes along the electric motor for cooling the electric motor. The air then passes through the arcuate through-holes 110c and the through-holes 131a, and enters into the centrifugal fan 130. Then the air changes direction by roughly 90 degrees within the centrifugal fan 130 and flows in the radial direction of the centrifugal fan 130, flows following the inner surface of the peripheral wall 110L, and flows out through the outlet 112. Such conventional blower is described in laid open Japanese Patent Application Publication No. 2002-339898. With the conventional structure, operation noise is the typical problem.

SUMMARY OF THE INVENTION

It is therefore, an object of the present invention to provide a blower having a centrifugal fan capable of reducing noise without degrading blowing or suction efficiency.

This and other object of the present invention will be attained by a blower including a casing, an electric motor, and a centrifugal fan including a generally circular base plate and a plurality of vanes. The casing is provided with a partition dividing an internal space of the casing into a fan housing and a motor housing. The partition has a first surface defining the motor housing and a second surface defining the fan housing. The casing is formed with an inlet allowing fluid communication between the fan housing and an exterior for sucking a fluid into the fan housing therethrough, and an outlet allowing fluid communication between the fan housing and the exterior for discharging fluid from the fan housing to the exterior therethrough. The casing is also formed with an introduction hole allowing fluid communication between the motor housing and the exterior. The electric motor is disposed in the motor housing. The centrifugal fan is disposed in the fan housing and is rotatable by the electric motor. The centrifugal fan defines a rotation axis. The generally circular base plate has one surface in direct confrontation with the second surface. The base plate defining a circumferential direction and is formed with a plurality of base plate through-holes arrayed in an imaginary circle whose center is coincident with the rotation axis for allowing fluid to pass therethrough. The plurality of vanes protrudes from the other surface of the base plate. The partition is formed with a plurality of partition through-holes arrayed in the imaginary circle and in selective alignment with the base plate through-holes in accordance with the rotation of the centrifugal fan. Each partition through-hole includes at least a width increasing region where a width of the partition through-holes in the circumferential direction is gradually increased toward the second surface.

In another aspect, there is provided a blower including a casing, the electric motor, and the centrifugal fan including the generally circular base plate and the plurality of vanes. The casing is provided with a partition dividing an internal space of the casing into a fan housing and a motor housing. The partition has a first surface defining the motor housing and a second surface defining the fan housing. The casing is formed with the inlet and the outlet. The casing is also formed with the fluid introduction hole. The partition is formed with a plurality of partition through-holes arrayed in the imaginary circle and in selective alignment with the base plate through-holes in accordance with the rotation of the centrifugal fan. The partition through-holes includes a first through-hole and a second through-hole positioned directly beside the first through hole in the circumferential direction. The first through-hole has a first linear flat surface extending in parallel to the rotation axis and a second linear flat surface extending in parallel to the first linear flat surface and spaced away from the first linear flat surface in the circumferential direction. The second through-hole has a first linear flat surface extending in parallel to the rotation axis and a second linear flat surface extending in parallel to the first linear flat surface and spaced away from the first liner flat surface in the circumferential direction. The second linear flat surface of the first through-hole and the first linear flat surface of the second through-hole are positioned side by side. A geometrical relationship of a>b is provided in which, a represents a width of the base plate through-hole at the one surface in the circumferential direction, and b represents a distance at the second surface and in the circumferential direction between a first intersection of the second linear flat surface of the first through-hole with the second surface and a second intersection of the first linear flat surface of the second through-hole with the second surface.

DETAILED DESCRIPTION OF THE PREFERRED EMBODIMENTS

Figure 1:
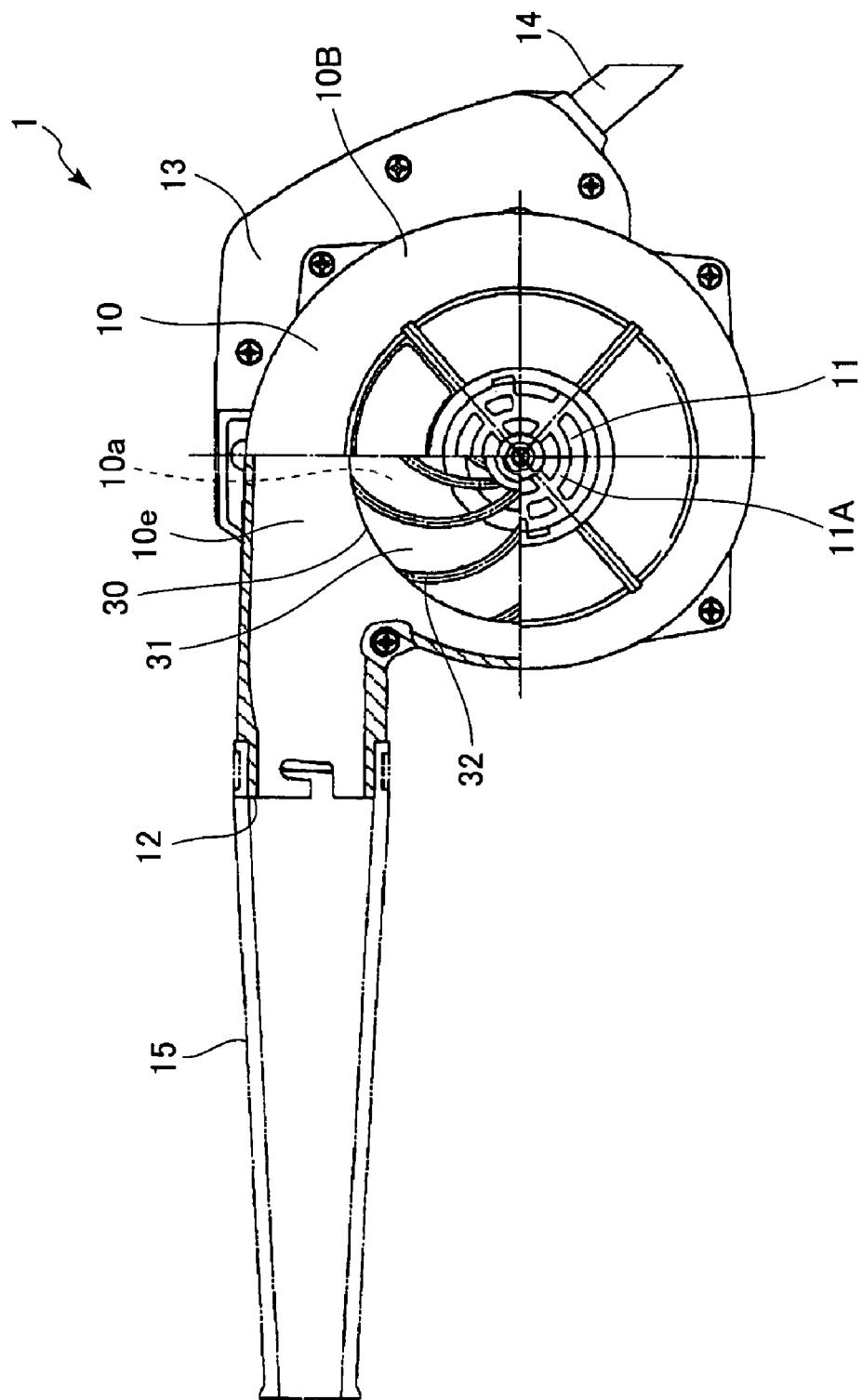
FIG. 1 is a partly cross-sectional side view showing a blower according to a first embodiment of the present invention.

A blower according to preferred embodiments of the present invention will be described while referring to the accompanying drawings wherein like parts and components are designated by the same reference numerals to avoid duplicating description.

First Embodiment

A blower 1 according to a first embodiment of the present invention will be described with reference to FIGS. 1 through 8. The first embodiment pertains to a compact and lightweight portable blower also serving as a dust collector. The blower 1 includes a casing 10 formed with an inlet 11 for sucking in air and an outlet 12 for blowing out air. The casing 10 has a handle 13 to be gripped by a user's hand.

An electric motor 20 (FIG. 4) and a centrifugal fan 30 are installed in the casing 10. The centrifugal fan 30 is drivingly coupled to the electric motor 20 via a drive shaft 21 (FIG. 4) described later, and is rotated by the rotation of the electric motor 20. The electric motor 20 is driven with electric power supplied via an electric cord 14 (FIG. 1) extending from the casing 10. Air is sucked into the casing 10 through the inlet 11, and is blown out through the outlet 12 by the centrifugal force established by the rotation of the centrifugal fan 30. The outlet 12 is connected to a fan housing space 10*a* defining a spiral chamber 10*e* (described later) formed in the casing 10, and is located on a tangential line of a base plate 31 (described later) of the centrifugal fan 30 disposed in the fan housing space 10*a*.

A portion around the outlet 12 serves as an attachment region to which accessories such as a dust collection bag 16 (FIG. 2) or a nozzle 15 is selectively attached. The inlet 11 has a generally arcuate shape and is positioned in confrontation with so as to face the centrifugal fan 30 and coaxially with the centrifugal fan 30.

As shown in FIG. 1, when the blower 1 is used in a blower mode to blow away dusts, fallen leaves, wood chips, etc., the nozzle 15 is attached to the outlet 12 of the casing 10, while nothing is attached to the inlet 11. Blowing operation can be performed by directing the tip of the nozzle 15 toward the dusts, small wood chips or other such objects and blowing out pressurized air through the nozzle 15. Incidentally, even without the nozzle 15 blowing operation can still be performed by directing the outlet 12 toward the target and blowing air out from the outlet 12.

Figure 2:
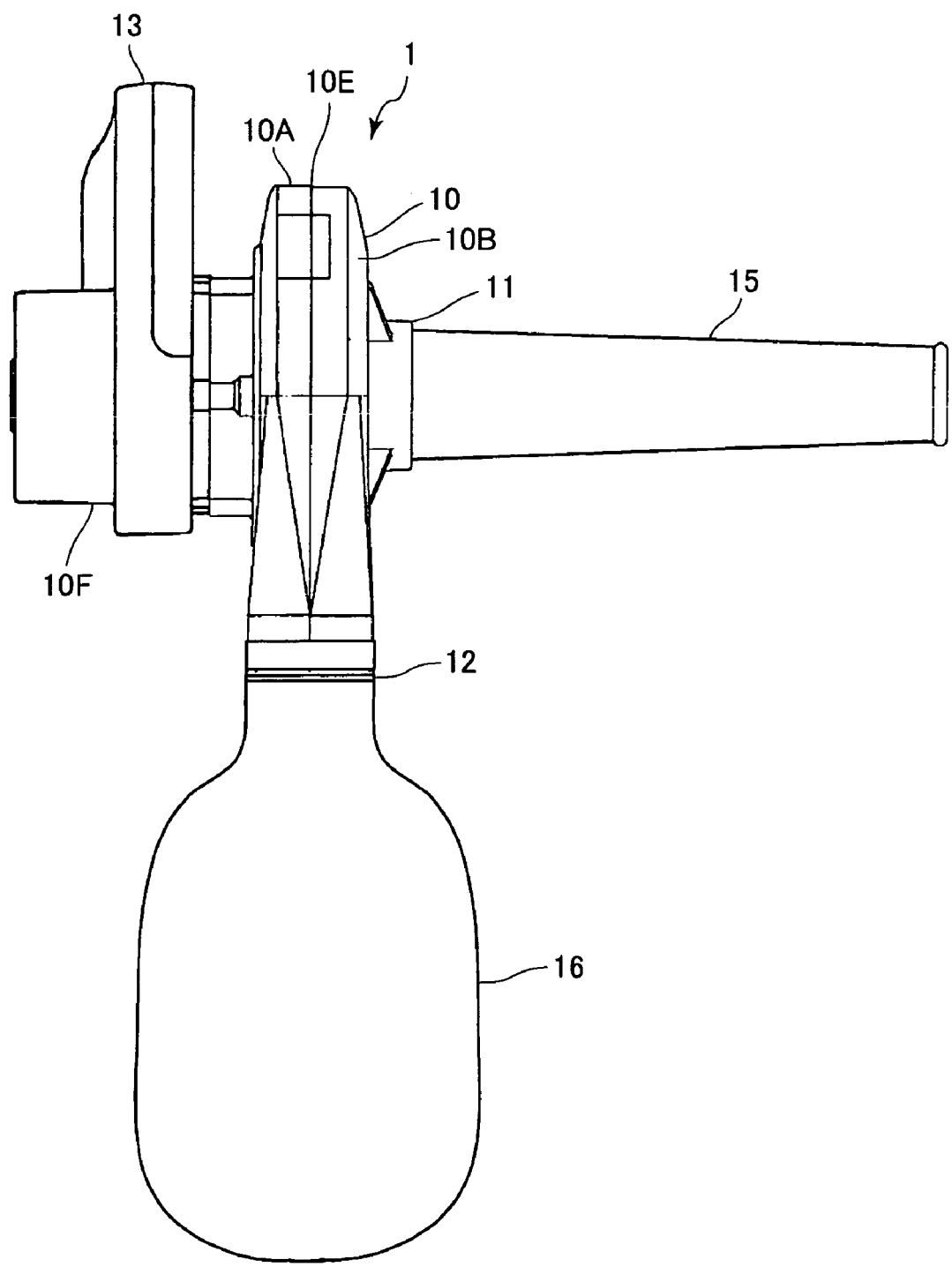
FIG. 2 is a plan view showing the blower with a nozzle attached to an inlet and a dust collection bag attached to an outlet according to the first embodiment of the present invention in which the blower functions as a blower.
Figure 3:
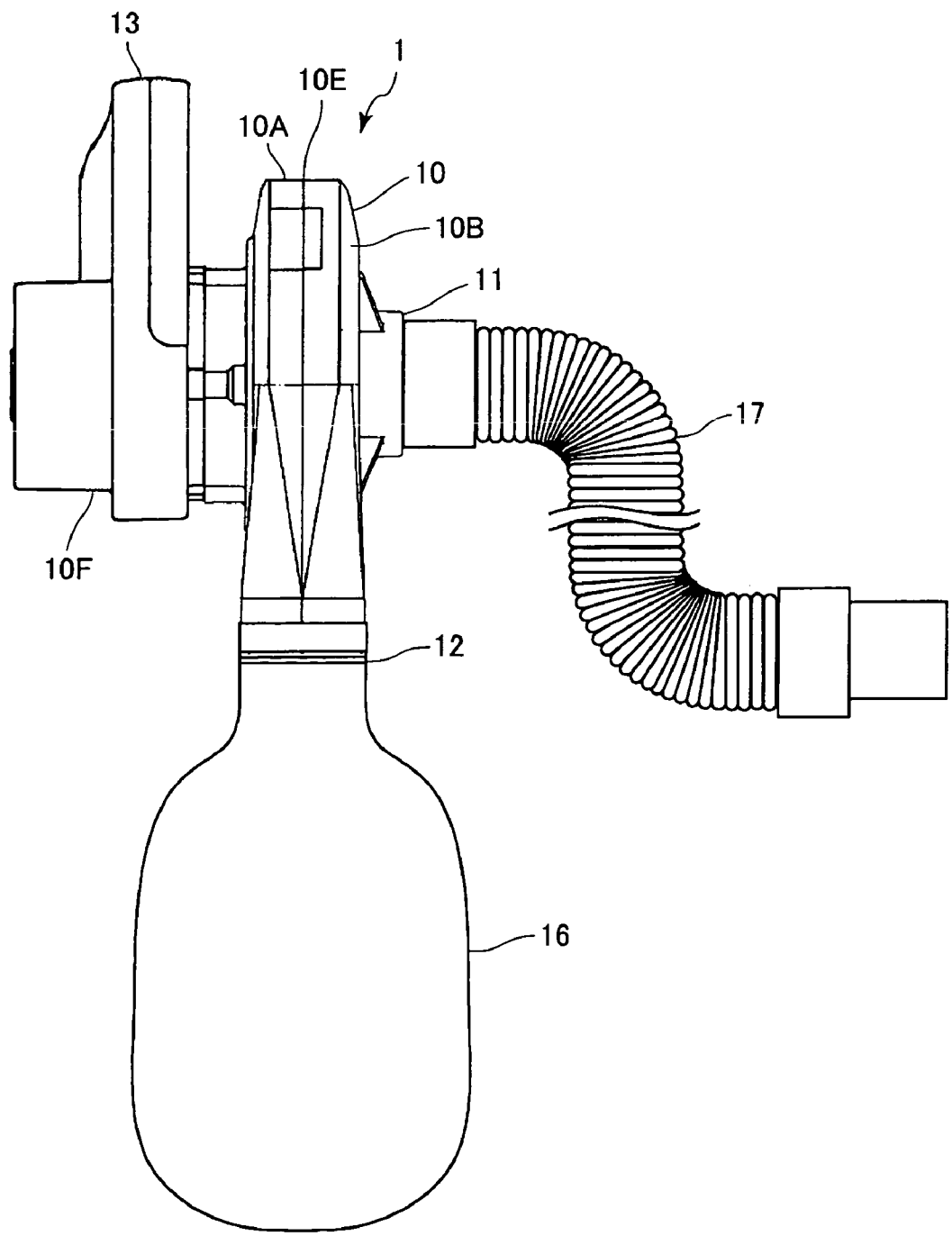
FIG. 3 is a plan view showing the blower with a hose attached to the inlet and a dust collection bag attached to the outlet according to the first embodiment of the present invention in which the blower functions as a vacuum device.

Furthermore, as shown in FIGS. 2 or 3, when the blower 1 is to be operated in a suction mode to collect dusts, wood chips, etc., the dust collection bag 16 is attached to the outlet 12 on the casing 10, while the nozzle 15 or a hose 17 shown in FIG. 3 is attached to the inlet 11. Suction operation can be performed by directing the tip of the nozzle 15 or the hose 17 toward dusts, small wood chips, or other such objects and then sucking in the objects into the dust collection bag 16.

Figure 4:
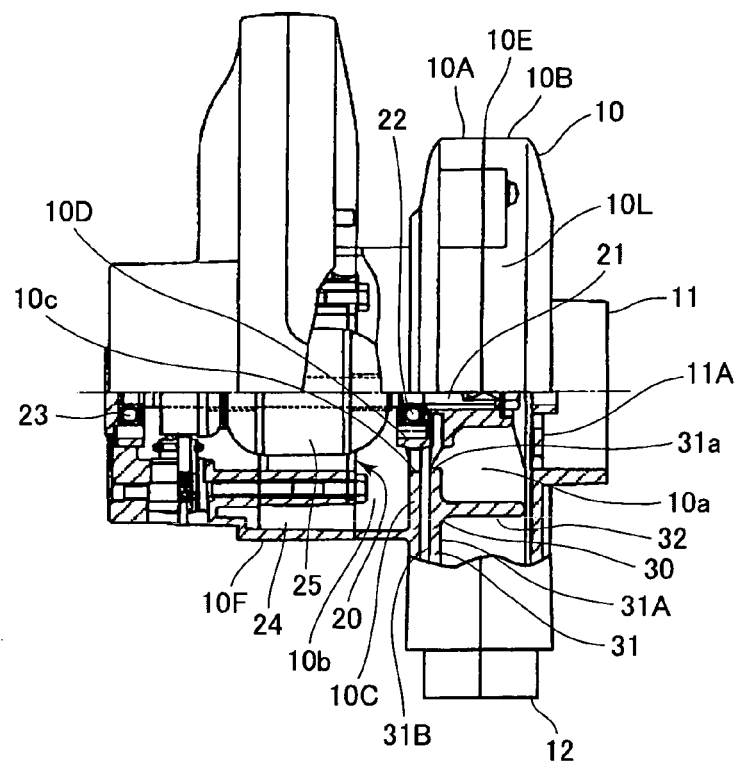
FIG. 4.is a partial cross-sectional plan view showing the blower according to the first embodiment.

The casing 10 is composed of a plurality of separable segments. As shown in FIG. 4, a mutually opposing first segment 10A and second segment 10B define the fan housing space 10*a* for installing therein the centrifugal fan 30. The first segment 10A includes a circular partition 10C partitioning the fan housing space 10*a* from a motor housing space 10*b* (described later) and a peripheral wall 10L. The first segment 10A has bearing holder 10D (FIG. 5) for accommodating a bearing 22. The bearing holder 10D is adapted for supporting a rotor 25 of the motor 20. The centrifugal fan 30 is concentrically mounted on the rotor 25.

Figure 5:
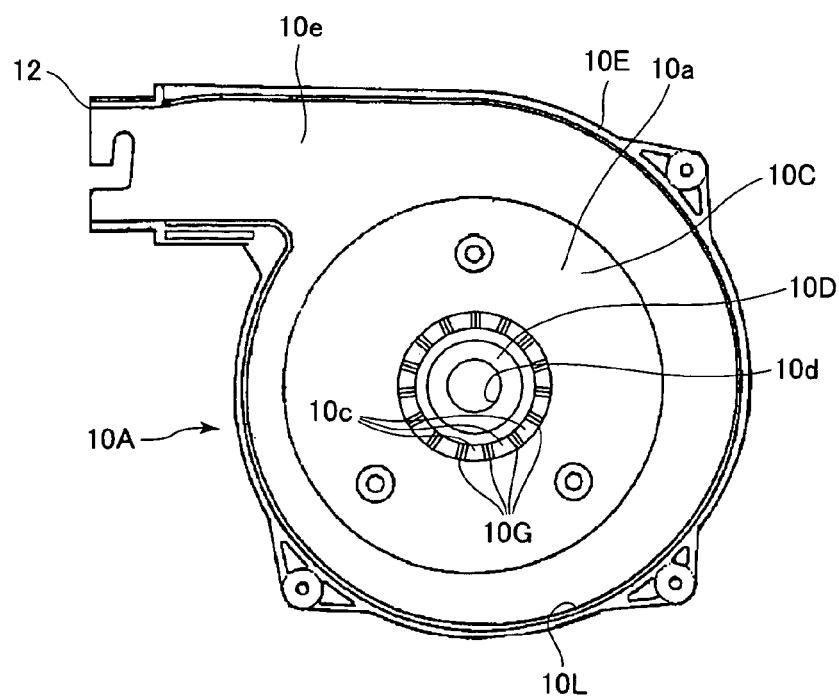
FIG. 5 is a side view particularly showing a first segment constituting a casing and defining a fan housing space in the blower according to the first embodiment.

As shown in FIG. 5, a drive shaft through-hole 10*d* (FIG. 5) is formed at the center of the circular partition 10C and within the bearing holder 10D for allowing the drive shaft 21 (FIG. 4) to extend therethrough. Further, partition through-holes 10*c* are formed at radially outer side and adjacent to the bearing holder 10D. The partition through-holes 10*c* are located on a imaginary circle whose center is coincident with axis of the drive shaft 21, i.e. the center of the circular partition 10C. In the present embodiment, fifteen partition through-holes 10*c* are formed at a constant interval along the peripheral direction. Neighboring partition through-holes 10*c* are separated from each other by a region 10G.

The casing 10 also includes a third segment 10F connected to the first segment 10A with a bolt or the like at a position opposite to the fan housing space 10 with respect to the partition 10C. The third segment 10F has generally cylindrical cup shape and is coaxial with the centrifugal fan 30. A bottom of the cup serves as an end wall of the casing 10, and an open end of the third segment is fitted to the first segment 10A. Thus, the third segments 10F defines therein an electric motor housing space 10*b* where the electric motor 20 is supported. The partition 10C separates the fan housing space 10*a* from the motor housing space 10*b*. A bearing 23 is supported at a distal end of the third segment 10F. Thus, the drive shaft 21 is rotatably supported to the casing 10 through these bearings 22 and 23. One open end of each partition through-hole 10*c* is open to the motor housing space 10*b*, and other open end is open to the centrifugal fan housing space 10*a*. The end wall section or a region gear the end wall section is formed with an air introduction hole (not shown) for introducing air into the motor housing space 10*b*.

Figure 15:
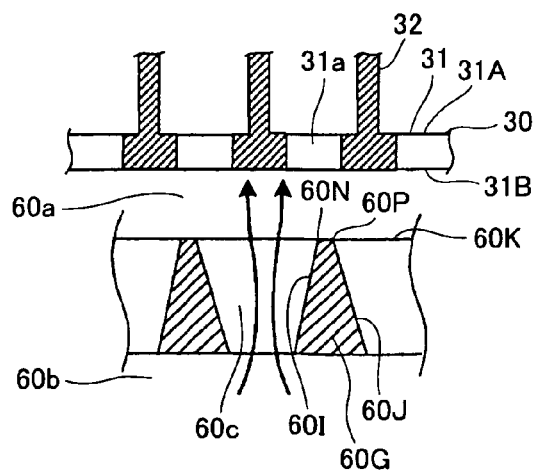
FIG. 15 is a cross-sectional view converting a circumferential arrangement of through-holes into a linear arrangement thereof for description of positional relationship between a partition of a casing and a base plate of a centrifugal fan according to a fourth embodiment of the present invention.

The centrifugal fan 30 is substantially same as the conventional centrifugal fan 130 shown in FIG. 15. That is, the centrifugal fan 30 includes the base plate 31 and multiple spiral vanes 32 projecting from one surface 31A of the base plate 31. The drive shaft 21 is fixed to the center of the base plate 31 by force-fitting or using fasteners such as a bolt. As shown in FIG. 4, the base plate 31 has an opposite surface 31B positioned in direct confrontation with the circular partition 10C of the first segment 10A. A distance between a surface of the base plate 31 and a confronting surface or facing surface of the partition 10C is approximately 3 mm.

A plurality of through-holes 31*a* are formed in the base plate 31. Each through-hole 31*a* is positioned between neighboring vanes 32, and is positioned in an imaginary circle whose center is coincident with the axis of the drive shaft 21. Further, the through-holes are spaced away from each other at an equal interval in a circumferential direction of the drive shaft 21.

The base plate through-holes 31*a* are adapted to permit air to flow from the motor housing space 10*b* to the centrifugal fan housing space 10*a* through the through-holes 10*c* at the partition 10C of the first segment 10A. More specifically, the base plate through-holes 31*a* (FIG. 4) are positioned in alignment with the partition through-holes 10*c* in an axial direction of the drive shaft 21. The base plate through-holes 31*a* are brought into direct confrontation or facing with the partition through-holes 10*c* depending on the angle of rotation of the centrifugal fan 30.

The second segment 10B is coupled to the first segment 10A as shown in FIG. 4 at a parting face 10E extending in a direction perpendicular to the axis of the drive shaft 21. The second segment 10B includes an end wall section in confrontation or facing with the partition 10C of the first segment 10A, and a peripheral wall section corresponding to the peripheral wall 10L of the first segment 10A. By the combination of the first segment 10A and the second segment 10B, single fan housing space 10*a* a is provided. More specifically, the partition 10C, the peripheral wall 10*a* of the first segment 10A, and the end wall section and the corresponding peripheral wall of the second segment 10B provide the fan housing space 10*a*. A spiral chamber 10*e* (FIG. 5) is defined between radially outer end of the vanes 21 and the peripheral walls 10L for collecting air from the centrifugal fan 30 and for directing the air to the outlet 12.

The above-described inlet 11 is formed in the second segment 10B coaxially with the centrifugal fan 30 as shown in FIG. 4. A sleeve like protrusion protrudes from the inlet 11 in the axial direction of the fan 30. Thus, the nozzle 15 or other accessory is detachably attached to the sleeve like protrusion. The sleeve like protrusion is configured to have a shape and size identical with those of the attachment region around the outlet 12, so that an identical nozzle 15 can be selectively attached to one of the attachment region and the sleeve like protrusion. The inlet 11 is equipped with ribs 11A (FIGS. 1 and 4) to prevent fingers etc. from coming into contact with the centrifugal fan 30 in the casing 10.

As shown in FIG. 4, the electric motor 20 includes a stator 24 and a rotor 25. The stator 24 is fixed to the inner surface of the third segment 10C of the casing 10. The rotor 25 is fixed to the drive shaft 21 and is positioned between the bearings 22 and 23. The rotation of the rotor 25 integrally rotates the drive shaft 21.

Figure 6:
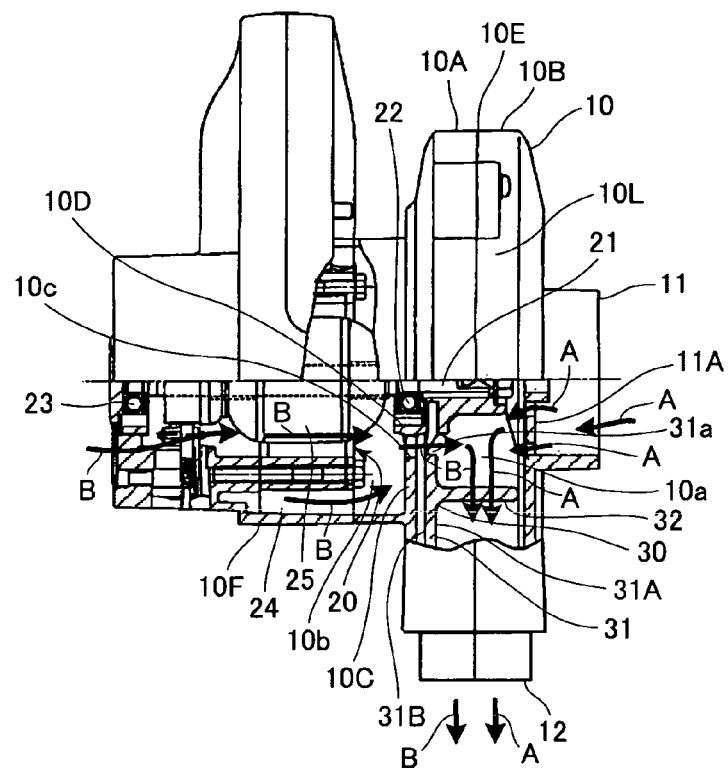
FIG. 6 is a partial cross-sectional plan view particularly showing flow of air within the blower according to the first embodiment.

Rotation of the centrifugal fan 30 generates air flow flowing from the inlet 11 to the outlet 12 as shown by an arrow A in FIG. 6. That is the air passes through the inlet 11 in the axial direction of the fan 30. Then the air flows into the centrifugal fan 30, and changes flowing direction by roughly 90 degrees within the centrifugal fan 30, and flows radially outwardly to the spiral chamber 10e. Then the air flows along the peripheral wall 10L of the spiral chamber 10e, and is discharged out of the outlet 12.

Air also flows within the electric motor 20 as a result of rotation of the centrifugal fan 30 driven by the electric motor 20. More specifically, upon rotation of the centrifugal fan 30, air is introduced into the motor housing space 10b through the air introduction hole, and the air flows in the axial direction of the centrifugal fan 30 between the stator 24 and rotor 25 of the electric motor 20 as shown by an arrow B in FIG. 6 for cooling the motor 20. The air then flows through the partition through-holes 10c and the base plate through-holes 31a of the centrifugal fan 30 into the fan housing space 10a. Then, the air changes its flowing direction by roughly 90 degrees within the centrifugal fan 30 and flows radially outwardly to the spiral chamber 10e. Then the air flows along the peripheral wall 10L of the spiral chamber 10e, and is discharged out of the outlet 12.

Next, the shape of the partition through-holes 10c will be described with reference to FIG. 7. The partition 10C has a confronting or facing surface 10K in direct confrontation with the surface 31B of the base plate 31. Each through-hole 10c is defined by a flat first surface 10H and a flat second surface 10H opposing thereto. A distance between the first and second surfaces 10H and 10H at the surface 10K defines a width of the through-hole 10c in the circumferential direction of the partition l0C, i.e., in the leftward/rightward direction in FIG. 7. In other words, each separating section 10G is defined by a generally flat first surface 10I (equivalent to 10H) and a generally flat second surface 10J (equivalent to 10H) intersecting the first surface 10I at the confronting or facing surface 10K.

Speaking differently, a distance between the first and second surfaces 10H, 10H of each through-hole 10c in the peripheral direction of the base plate 31 is gradually increased from the motor housing space 10b toward the fan housing space 10a. Each separating region 10G serves as a circumferential width increasing section.

Figure 7:
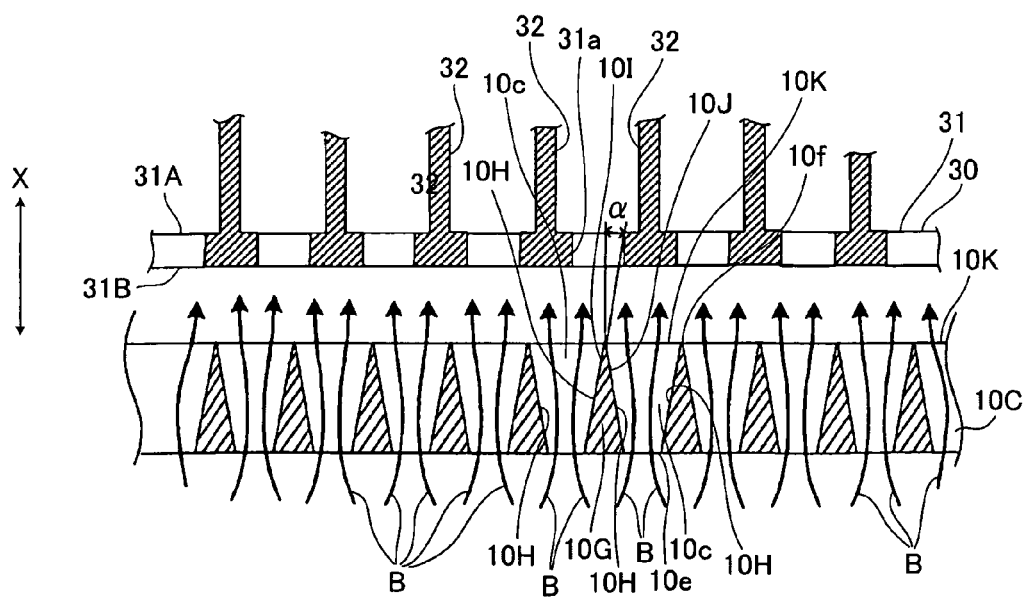
FIG. 7 is a cross-sectional view converting a circumferential arrangement of through-holes into linear arrangement thereof for description of positional relationship between a partition of the casing and a base plate of a centrifugal fan according to the first embodiment.
Figure 8:
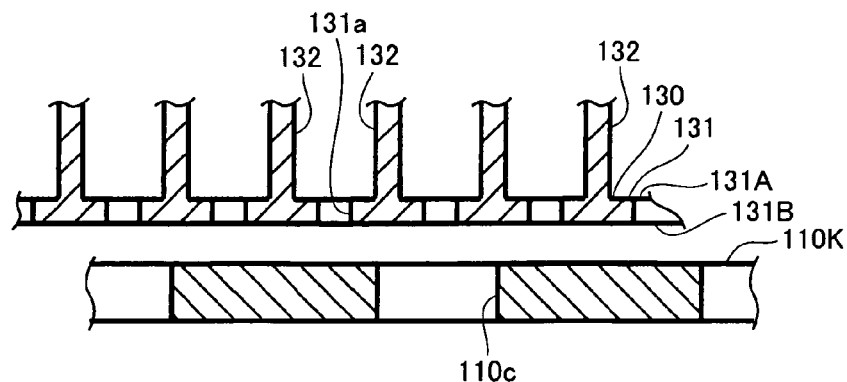
FIGS. 8 through 11 are cross-sectional views each converting a circumferential arrangement of through-holes into a linear arrangement thereof for description of positional relationship in time elapse basis between a partition of the casing and a base plate of the centrifugal fan according to a comparative blower.

In FIG. 7, an angle α between a line in parallel with an axis X of the centrifugal fan 30 and the flat surface 10H is in a range of from 10 to 30 degrees. As described above and as shown by the arrow B in FIG. 7, the air which has cooled the motor 20 in the motor housing space 10b flows through each partition through-hole 10c along the pair of opposing flat surfaces 10H into the base plate through-hole 31a. Thus, the air is flowed into the centrifugal fan housing space 10a.

A generation of air vortex and noise will be described with reference to a comparative having a partition 110C and a centrifugal fan 130 provided with a base plate 131. The present inventors found particular problems in the comparative blower. That is, since the base plate 131 and the partition 110C are in proximal opposition, the amount of air flowing through base plate through-holes 131a fluctuates greatly from moment to moment. Specifically, focusing on one of the through-holes 131a, in the state shown in FIG. 8, an inlet opening of the base plate through-hole 131a on the other surface 131B of the base plate 131 is offset, in an axial direction of the fan 130, from an outlet opening of the partition through-hole 110c open on a surface 110K of the partition 110C opposing the other surface 131B. Therefore, most of the air flowing out of the partition through-hole 110c does not flow into the base plate through-hole 131a.

Figure 9:
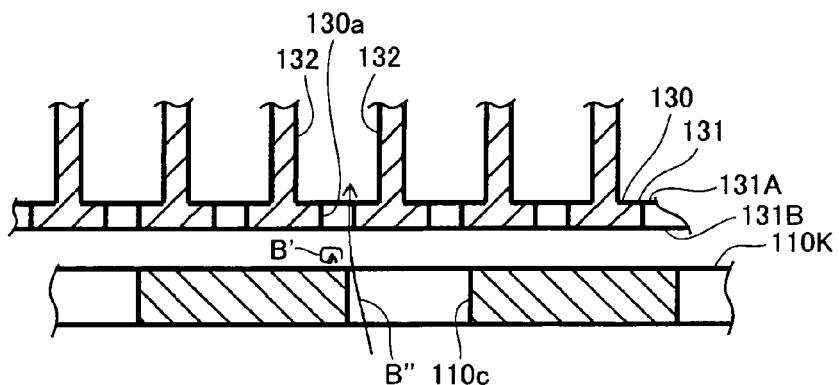

When the centrifugal fan 130 rotates and assumes the state shown in FIG. 9, the inlet opening of the base plate through-hole 131a is partly brought into alignment with the outlet opening of the partition through-hole 110c in the axial direction of the fan 130. Therefore, the air flowing out of the partition through-hole 110c flows into the base plate through-hole 131a as shown by arrow B". Further, the air gives rise to a vortex as shown by arrow B' in FIG. 9.

Figure 10:
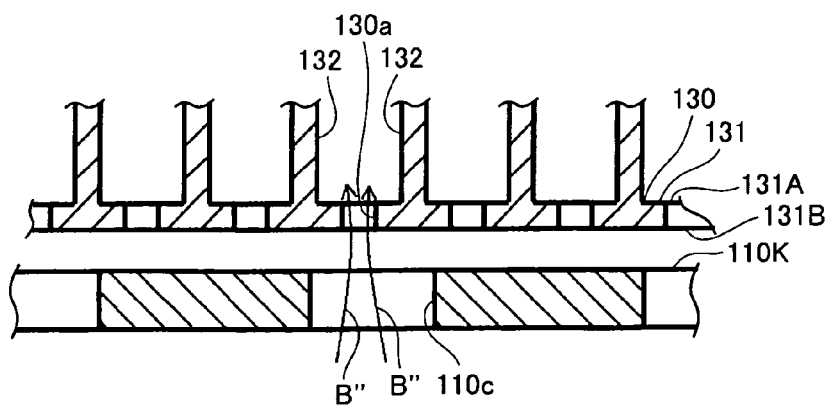

When the centrifugal fan 130 rotates further and assumes the state shown in FIG. 10, the inlet opening of the base plate through-hole 131a is in complete alignment with the outlet opening of the partition through-hole 110c in the axial direction. Therefore, the air flowing out from the partition through-hole 110c flows smoothly into the base plate through-hole 131a as shown by arrow B" in FIG. 10.

Figure 11:
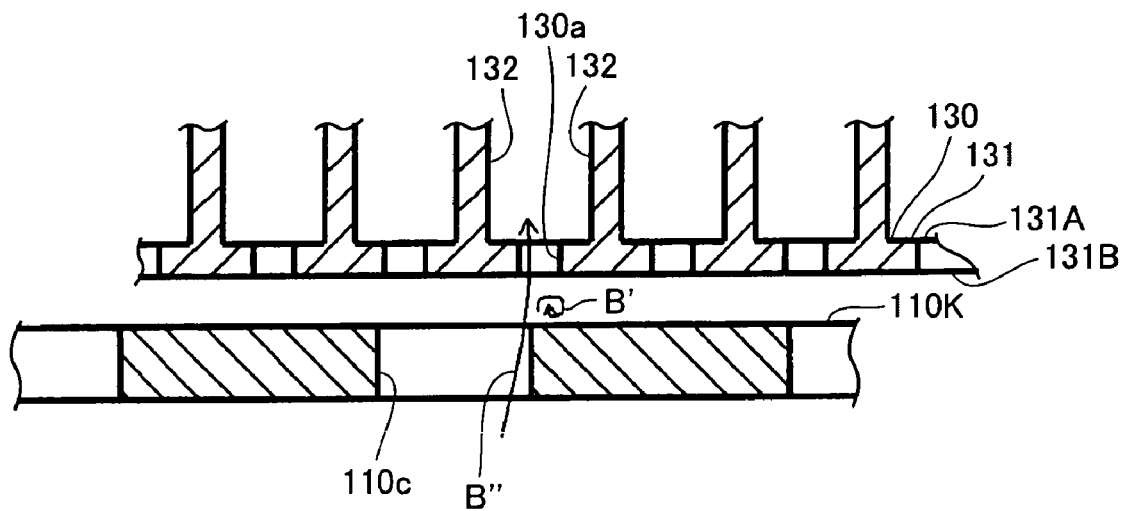

When the centrifugal fan 130 rotates further and assumes the state shown in FIG. 11, the inlet opening of the base plate through-hole 131a is no longer in alignment with the outlet opening of the partition through-hole 110c in the axial direction of the fan 130. Therefore, part of the air flowing out of the partition through-hole 110c gives rise to a vortex as shown by arrow B' in FIG. 11, and the amount of air flowing into the base plate through-hole 131a as shown by arrow B" is decreased.

Due to the repetition of the above phenomena, significant pressure variations have arisen in the base plate through-holes 131a etc., and a great deal of noise has been generated. In addition, as shown in FIGS. 9 and 11, noise has also been generated due to the vortices arising near the partition through-holes 110c. Furthermore, problems have arisen in that these noises are harsh since they constitute component sounds of the revolutionary frequency of the centrifugal fan, and in addition become even louder due to resonance in the centrifugal fan housing space 110a.

Since the angle α of the flat surfaces 10H relative to the axis X of the centrifugal fan 30 is in a range of from 10 to 30 degrees, generation of a peeled flow can be restrained, and almost all air can flow along the surfaces 10H of the through-hole 10c. The peeled flow is the phenomenon where air passing through each partition through-hole does not flow along the surface of the through-hole. Accordingly, in the embodiment, vortices can be almost entirely prevented from occurring. In particular, by setting the angle α to 23 degrees, generation of vortices can be maximally prevented.

Comparative experiments were conducted regarding the blower 1 according to the first embodiment and a comparative blower 101 to investigate air flow mode flowing from the partition through-holes 10c to the base plate through-holes 31a. Positional relationship on time elapsing basis between the base plate through-holes 131a and the partition through-holes 110c according to the comparative blower is shown in FIGS. 12(a) through 12(d). Further, positional relationship on time elapsing basis between the base plate through-holes 31a and the partition through-holes 10c according to the present embodiment is shown in FIGS. 12(f) through 12(i). Further, test results representing the flow amount over time is shown in FIG. 12(e) where a curve C1 represents data in the present embodiment, and a curve C2 represents data in the comparative blower. The data indicates amount of air flowing through one of the partition through-holes into one of the base plate through-holes when the centrifugal fan is rotating. The respective air flow from the partition through-holes to the base plate through-holes is shown by arrows B and B'.

Figure 12:
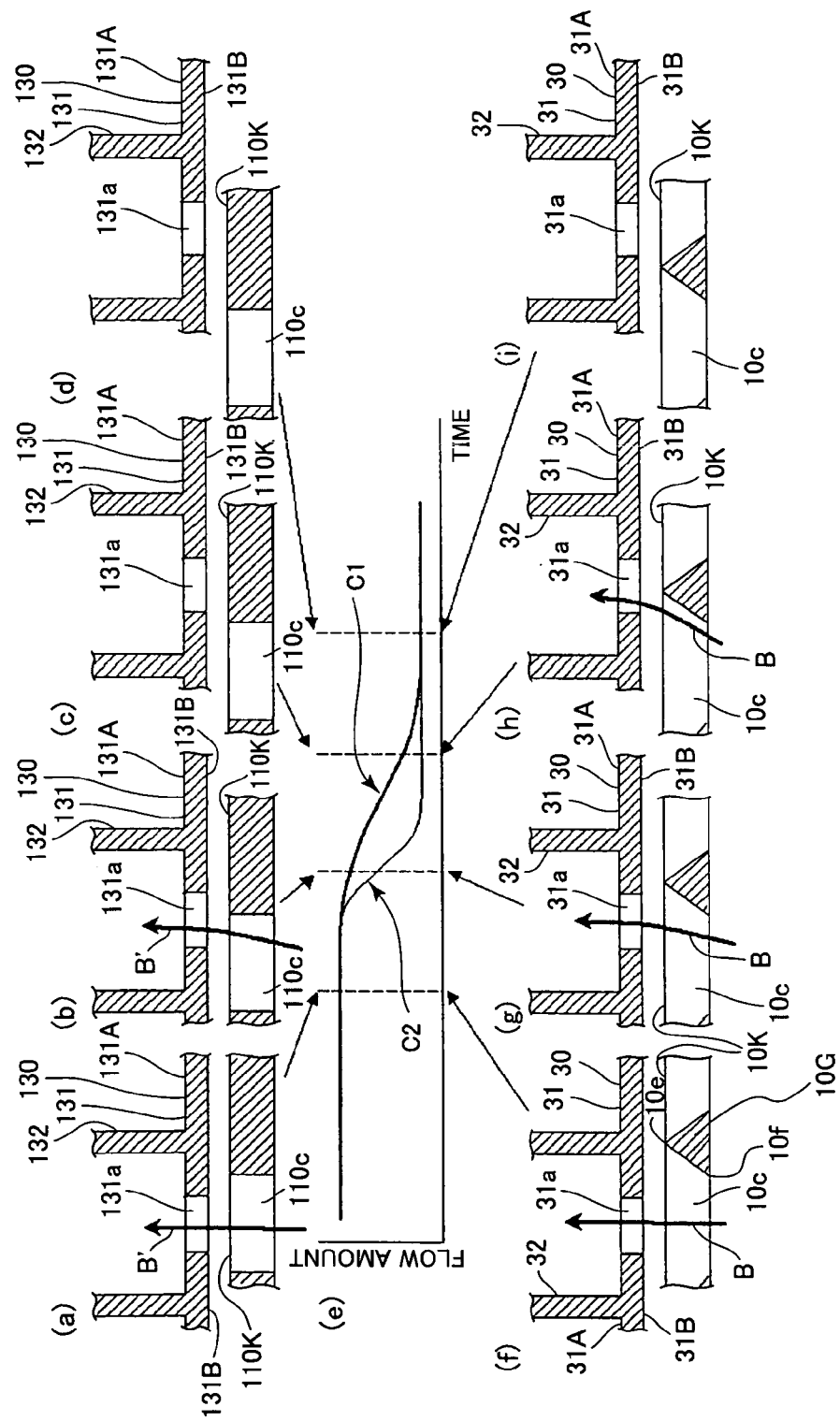
FIGS. 12(a) through 12(d) show positional relationship on time elapsing basis between base plate through-holes and partition through-holes according to a comparative blower.
FIG. 12(e) shows test results representing the relationship between time and flow amount where a curve C1 represents data in the present embodiment, and a curve C2 represents data in the comparative blower.
FIGS. 12(f) through 12(i) show positional relationship on time elapsing basis between base plate through-holes and partition through-holes according to the present embodiment.

Focusing on a single base plate through-hole 131a on the comparative centrifugal fan, as the centrifugal fan rotates to the transition from the state shown in FIG. 12(*a*) to the state shown in FIG. 12(*d*), the through-hole 131a passes through the through-hole 110c as shown in FIG. 12(*b*). As is apparent from the graph shown in FIG. 12(*e*), a rapid decrease in airflow, i.e., a rapid pressure change occurred in the phase shown in FIG. 12(*b*). Further, airflow has already reached its lowest value in the phase shown in FIG. 12(*c*)

In contrast, in the first embodiment, as the centrifugal fan 30 rotated to transition from the state shown in FIG. 12(*f*) to the state shown in FIG. 12(*i*), the through-hole 31a passed through the through-hole 10c as shown in FIG. 12(*g*) and 12(*h*). As is apparent from the graph shown in FIG. 12(*e*), no substantial decrease in air flow amount occurred throughout the phase from FIG. 12(*f*) to FIG. 12(*g*). Thereafter, the gradual decrease in air flow amount was started. At the transition to the state shown in FIG. 12(*h*), airflow has not yet reached its lowest value, but a significant amount of air was still flowing. The gradual decrease in air flow amount was continued, and then airflow has already reached its lowest value in the phase shown in FIG. 12(*i*)

Since the circumferential width (distance between the surfaces 10H and 10H in the peripheral direction of the circular partition 10C) of the partition through-holes 10c gradually increases from the side of the motor housing space 10b to the side of the fan housing space 10a, uniform air flowing speed distribution results over the downstream side of the partition through-holes 10c near the side 10K of the partition through-holes 10c. For this reason, rapid pressure changes at an area between the partition through-holes 10c and the base plate through-holes 31a can be prevented but a moderate pressure change results. In addition, vortices are hardly generated at positions near the outlet end of the partition through-holes 10c. For this reason, the generation of noise can be restrained.

In addition, since the entire partition through-hole 10c from the open end 10f opening to the fan housing space 10a to the open end 10e opening to the electric motor housing space 10b constitutes the circumferential width increasing section, variation in air pressure at the space between the partition 10C and the base plate 31 can be further lowered. Furthermore, generation of vortices at positions near the outlet end of the partition through-holes 10c does not occur. For this reason, the generation of noise can be further restrained.

Further, since each partition through-holes 10c are defined by a pair of linear flat surfaces 10H and 10H, the above described advantageous effect can further be enhanced.

Figure 13:
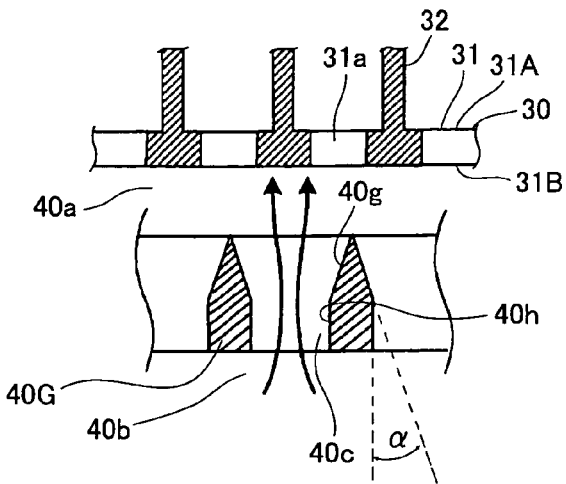
FIG. 13 is a cross-sectional view converting a circumferential arrangement of through-holes into a linear arrangement thereof for description of positional relationship between a partition of a casing and a base plate of a centrifugal fan according to a second embodiment of the present invention.

Next, a blower according to a second embodiment of the present invention will be described with reference to FIG. 13. In the blower according to the first embodiment, the entire surface 10H, 10H of the partition through-hole 10c from the open end 10f opening to the fan housing space 10a to the open end 10e opening to the electric motor housing space 10b constitutes a circumferential width increasing section for the through hole 10c. On the other hand, in the second embodiment shown in FIG. 13, a circumferential width increasing section 40g of a separation segment 40G is formed at a position opening to the fan housing space 40a, and a remaining section 40h opening to the motor housing space 40b provides a constant circumferential width for the through hole 40c. Other arrangement is the same as that of the first embodiment. An angle α is defined between the surface 40h and the surface 40g.

This arrangement can be easily provided by modifying shape of the partition through-holes 110c of the conventional blower 101. Thus, rapid air pressure variations at the location between the partition through-holes 40c and the base plate through-holes 31a can be prevented.

Next, a blower according to a third embodiment of the present invention will be described with reference to FIG. 14. In the blower according to the second embodiment, the inclined surface 40g of the separating section 40G forming the circumferential width increasing section and the surface 40h of the separating section 40G forming a constant circumferential width of the through hole 40c are intersected with each other an the specific angle α. In the third embodiment, instead of the discontinuous connection between the surfaces 40g and 40h, the corresponding surface 50g and 50h are continuously connected with an arcuate surface 50M as shown in FIG. 14.

Figure 14:
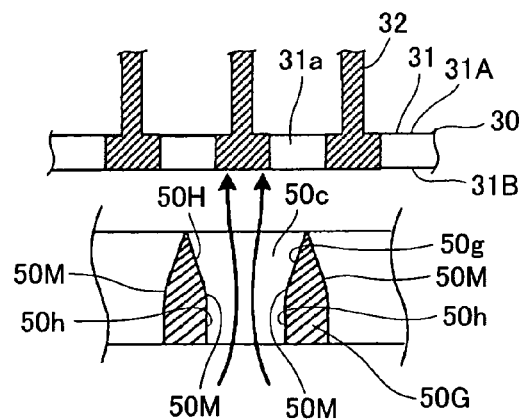
FIG. 14 is a cross-sectional view converting a circumferential arrangement of through-holes into a linear arrangement thereof for description of positional relationship between a partition of a casing and a base plate of a centrifugal fan according to a third embodiment of the present invention.

As shown in FIG. 14, a separation segment 50G includes a pair of inclined surfaces 50g corresponding to the surfaces 40g of the second embodiment, and a pair of parallel surfaces 50h corresponding to the surfaces 40h of the second embodiment, and each surface 50H is connected smoothly to each surface 50h through the arcuate surface 50M having a specific radius. With this arrangement, air can flow smoothly along the arcuate surface 50M.

A blower according to a fourth embodiment of the present invention is shown in FIG. 15. In the blower according to the first embodiment, the first surface 10I and the second part 10J intersect with one each other at the surface 10K of the partition 10C. On the other hand, in the blower according to the fourth embodiment, the corresponding surfaces 60I and 60J of a separating section 60G do not intersect with each other at the surface 60K opposing a fan housing space 60a, but instead, a predetermined distance in the circumferential direction of the partition 10C is provided between an intersection point 60N of the surface 60K with the first surface 60I, and the intersection point 60P of the surface 60K with the second surface 60J. With such arrangement, each end region containing the points 60N and 60P of the separating section 60G can provide an improved mechanical strength in comparison with an acute end in the first through third embodiments.

Figure 16:
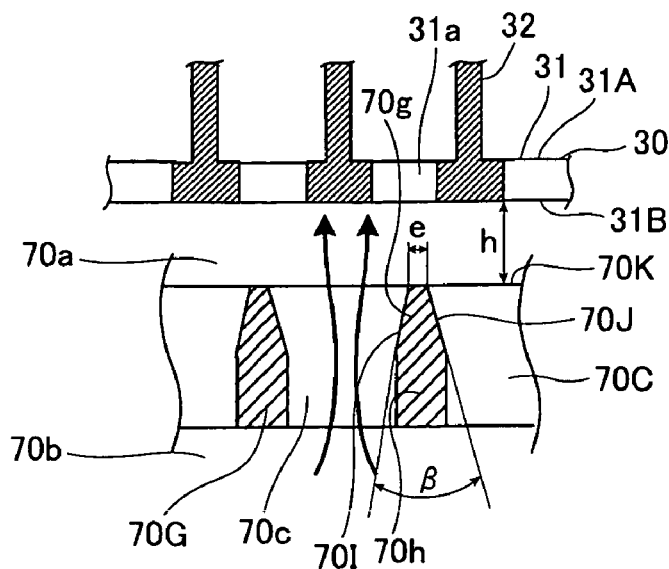
FIG. 16 is a cross-sectional view converting a circumferential arrangement of through-holes into a linear arrangement thereof for description of positional relationship between a partition of a casing and a base plate of a centrifugal fan according to a fifth embodiment of the present invention.

A blower according to a fifth embodiment of the present invention is shown in FIG. 16. In the fifth embodiment, a separating section 70G includes a circumferential width increasing section 70g containing inclined surfaces 70I and 70J and opening to a fan housing space 70a, and a constant circumferential width section 70h opening to a motor housing space 70b to thus provide a through-hole 70c.

The first surface 70I and the second surface 70J respectively intersect with a surface 70K at roughly the same angle. An angle between the first and second surfaces 70I and 70J is β. Further, similar to the fourth embodiment, an intersecting point between the first surface 70I and the surface 70K is spaced away from an in intersecting point between the second surface 70J and the surface 70K by a distance e in the circumferential direction of the partition 70C. Further in FIG. 16, h represents a distance between the surface 31B of the base plate 31 and the surface 70K of the partition 70C. The following relationship "h>(e/2)/tan(β/2)" is provided in the fifth embodiment. Remaining arrangement of the fifth embodiment is the same as that of the fourth embodiment.

With this arrangement, focusing on a single base plate through-hole 31a on the centrifugal fan, the air pressure variations due to changes in the volume of air flowing from the partition through-hole 70c can be made more gradual. Therefore, noise arising between the partition 70C and the base plate 31 can be decreased.

Figure 17:
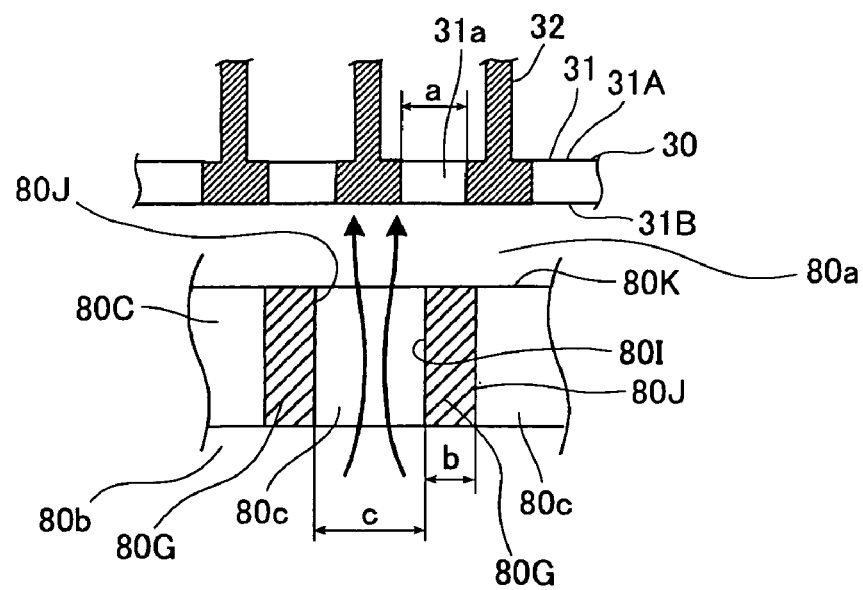
FIG. 17 is a cross-sectional view converting a circumferential arrangement of through-holes into a linear arrangement thereof for description of positional relationship between a partition of a casing and a base plate of a centrifugal fan according to a sixth embodiment of the present invention.
Figure 18:
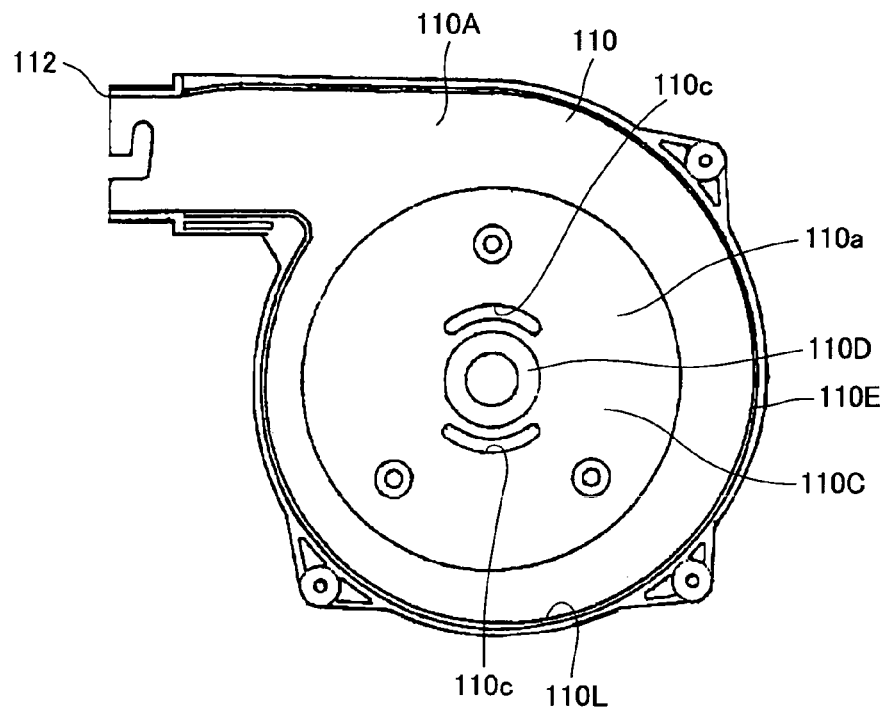
FIG. 18 is a side view showing a first segment constituting a casing and defining a fan housing space in a conventional blower.
Figure 19:
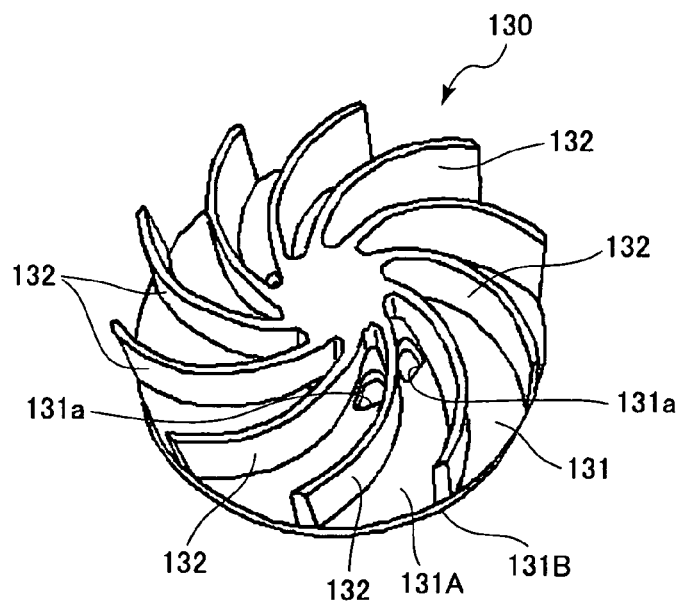
FIG. 19 is a perspective view showing a centrifugal fan in the conventional blower.

A blower according to a sixth embodiment of the present invention is shown in FIG. 17. In the blower according to the first embodiment, the entire surfaces 10I and 10J of the separating section 10G constitutes the circumferential width increasing section to provide a distance between the surfaces of the through-hole 10a, which distance is increased from the side of the motor housing space 10b toward the side of the fan housing space 10a. In the blower according to the sixth embodiment, as shown in FIG. 17, the separating segment 80G does not contain a circumferential width increasing section, but only contains a constant circumferential width section defined by first and second surfaces 80I and 80J extending in parallel with each other.

As shown in FIG. 17, the first and second surfaces 80I and 80J extend in parallel with the axis of the fan. Therefore, the through-hole 80c has a constant width in the circumferential direction of the base plate 31 over the entire length of the through-hole 80c in the axial direction of the fan. In FIG. 17, "a" represents a width of the through-hole 31 in circumferential direction of the base plate 31 at the surface 31B, and "b" represents a distance between a point of intersection of the first surface 80I with the surface 80K and a point of intersection of the second surface 80J with the surface 80K. the following relationship holds. With this condition, the relationship of "a>b" is provided.

With this arrangement, focusing on a single base plate through-hole 31a on the centrifugal fan 30, air can always flow into the specified base plate through-hole 31a from any one of the partition through-holes 80c. In other words, the specific through-hole 31a provides a continuous alignment with any one of the through holes 80c in the axial direction of the fan 30 even by the rotational displacement of the base plate 31. Thus, air pressure variations due to changes in the volume of air flowing from the partition through-hole 80c can be made more gradual, and thus, noise arising between the partition 80C and the base plate 31 can be decreased.

Further, in FIG. 17, "c" represents a distance between the second surface 80J of one separating section 80G and the first surface 80I of the neighboring separating section 80G in the circumferential direction of a partition 80C at a surface facing the motor housing space 80b. With this condition, the relationship of "c>a" is provided.

With this arrangement, the air pressure variations due to changes in the volume of air flowing into the base plate through-holes 31a from the partition through-hole 80c can be made more gradual. Thus, noise generating between the partition 80C and the base plate 31 can be decreased.

While the invention has been described in detail and with reference to specific embodiments thereof, it would be apparent to those skilled in the art that various changes and modifications may be made therein without departing from the scope of the invention.

For example, 18 partition through-holes 10c, 40c, 50c, 60c, 70c, 80c are formed in these embodiments. However, any number within the range of 7 to 20 is conceivable. Sufficient mechanical strength can be maintained particularly at the area of the bearing holder 10D and the through holes in the first segment 10A as long as the numbers of the through-holes is in the range of from 7 to 20. In particular, by forming 15 partition through-holes, the most desirable balance can be provided between the above-described mechanical strength and area of the through-holes. In addition, gas other than air is available in the blower 1.

Furthermore, the above-described relationship of $h > (e/2)/\tan(\beta/2)$ is also available in the fourth embodiment where only the circumferential width increasing section is provided.

What is claimed is:

1. A blower comprising:
a casing provided with a partition dividing an internal space of the casing into a fan housing and a motor housing, the partition having a first partition surface defining the motor housing and a second partition surface defining the fan housing, the casing being formed with an inlet allowing fluid communication between the fan housing and an exterior for sucking a fluid into the fan housing therethrough, and an outlet allowing fluid communication between the fan housing and the exterior for discharging fluid from the fan housing to the exterior therethrough, the casing being also formed with an introduction hole allowing fluid communication between the motor housing and the exterior;
an electric motor disposed in the motor housing; and
a centrifugal fan disposed in the fan housing and rotatable by the electric motor, the centrifugal fan defining a rotation axis and comprising:
a generally circular base plate having a first base plate surface directly facing the second partition surface and a second base plate surface, the base plate defining a circumferential direction and being formed with a plurality of base plate through-holes arrayed in an imaginary circle whose center is coincident with the rotation axis for allowing fluid to pass therethrough; and
a plurality of vanes protruding from the second base plate surface;
the partition being formed with a plurality of partition through-holes arrayed in the imaginary circle and in selective alignment with the base plate through-holes in accordance with the rotation of the centrifugal fan, each partition through-hole including at least a width increasing region where a width of the partition through-holes in the circumferential direction is gradually increased toward the second partition surface;
wherein a geometrical relationship of $h > (e/2)/\tan(\beta/2)$ is provided; in which
h represents a distance between the first base plate surface of and the second partition surface;
e represents a distance in the circumferential direction between a first intersection of the second linear flat plane of the first through-hole with the second partition surface and a second intersection of the first linear flat plane of the second through-hole with the second partition surface, the first linear flat plane of the second through-hole and the second linear flat plane of the first through-hole being positioned side by side in the circumferential direction; and
β represents an angle between the first linear flat plane of the second through-hole and the second linear flat plane of the first through-hole, an angle of the first linear flat plane of the second through-hole relative to the rotation axis being equal to an angle of the second linear flat plane of the first through-hole relative to the rotation axis.

2. The blower as claimed in claim 1, wherein each width increasing region extends across an entire thickness of the partition from the first partition surface to the second partition surface.

3. The blower as claimed in claim 1, wherein each width increasing region is defined by a first linear flat plane and a second linear flat plane positioned so as to face the first linear plane in the circumferential direction.

4. The blower as claimed in claim 1, wherein each partition through-hole further includes an arcuate region interposed between the width increasing region and the constant width region, the arcuate region having a specific radius of curvature.

5. The blower as claimed in claim 1,
wherein the inlet has a first attachment section and the outlet has a second attachment section having a configuration the same as that of the first attachment section, and the blower further comprises:
a tubular nozzle to be connected to the second attachment section in a blower mode and to be connected to the first attachment section in a vacuum mode; and
a dust collection bag to be connected to the second attachment section in the vacuum mode.

6. A blower comprising:
a casing provided with a partition dividing an internal space of the casing into a fan housing and a motor housing, the partition having a first partition surface defining the motor housing and a second partition surface defining the fan housing, the casing being formed with an inlet allowing fluid communication between the fan housing and an exterior for sucking a fluid into the fan housing therethrough, and an outlet allowing fluid communication between the fan housing and the exterior for discharging fluid from the fan housing to the exterior therethrough, the casing being also formed with an introduction hole allowing fluid communication between the motor housing and the exterior;
an electric motor disposed in the motor housing; and
a centrifugal fan disposed in the fan housing and rotatable by the electric motor, the centrifugal fan defining a rotation axis and comprising:
a generally circular base plate having a first base plate surface directly facing the second partition surface and a second base plate surface, the base plate defining a circumferential direction and being formed with a plurality of base plate through-holes arrayed in an imaginary circle whose center is coincident with the rotation axis for allowing fluid to pass therethrough; and
a plurality of vanes protruding from the second base plate surface,
the partition being formed with a plurality of partition through-holes arrayed in the imaginary circle and in selective alignment with the base plate through-holes in accordance with the rotation of the centrifugal fan, each partition through-hole including at least a width increasing region where a width of the partition through-holes in the circumferential direction is gradually increased toward the second partition surface;
wherein each width increasing region is located to directly open at the second partition surface;
wherein each partition through-hole further includes a constant width region connected to the width increasing region and opening to the first partition surface, the constant width region providing a width in the circumferential direction and a constant width in a direction of the rotation axis;
wherein the width increasing region is defined by a first linear flat plane and a second linear flat plane positioned so as to face the first linear plane in the circumferential direction;
wherein the plurality of partition through-holes include a first through-hole and a neighboring second through-hole; and
wherein a geometrical relationship of
$h > (e/2)/\tan(\beta/2)$ is provided; in which,
h represents a distance between the first base plate surface and the second partition surface;
e represents a distance in the circumferential direction between a first intersection of the second linear flat plane of the first through-hole with the second partition surface and a second intersection of the first linear flat plane of the second through-hole with the second partition surface, the first linear flat plane of the second through-hole and the second linear flat plane of the first through-hole being positioned side by side in the circumferential direction; and
$\beta$ represents an angle between the first linear flat plane of the second through-hole and the second linear flat plane of the first through-hole, an angle of the first linear flat plane of the second through-hole relative to the rotation axis being equal to an angle of the second linear flat plane of the first through-hole relative to the rotation axis.

7. A blower comprising:
a casing provided with a partition dividing an internal space of the casing into a fan housing and a motor housing, the partition having a first partition surface defining the motor housing and a second partition surface defining the fan housing, the casing being formed with an inlet allowing fluid communication between the fan housing and an exterior for sucking a fluid into the fan housing therethrough, and an outlet allowing fluid communication between the fan housing and the exterior for discharging fluid from the fan housing to the exterior therethrough, the casing being also formed with a fluid introduction hole allowing fluid communication between the motor housing and the exterior;
an electric motor disposed in the motor housing;
a centrifugal fan disposed in the fan housing and rotatable by the electric motor, the centrifugal fan defining a rotation axis and comprising:
a generally circular base plate having a first base plate surface directly facing the second partition surface and a second base plate surface, the base plate defining a circumferential direction and being formed with a plurality of base plate through-holes arrayed in an imaginary circle whose center is coincident with the rotation axis for allowing fluid to pass therethrough; and
a plurality of vanes protruding from the second base plate surface,
the partition being formed with a plurality of partition through-holes arrayed in the imaginary circle and in selective alignment with the base plate through-holes in accordance with the rotation of the centrifugal fan, the partition through-holes including a first through-hole and a second through-hole positioned beside the first through hole in the circumferential direction, the first through-hole having a first linear flat surface extending in parallel to the rotation axis and a second linear flat surface extending in parallel to the first linear flat surface and spaced away from the first linear flat surface in the circumferential direction, the second through-hole having a first linear flat surface extending in parallel to the rotation axis and a second linear flat surface extending in parallel to the first linear flat surface and spaced away from the first linear flat surface in the circumferential direction, the second linear flat surface of the first through-hole and the first linear flat surface of the second through-hole being positioned side by side, and wherein a geometrical relationship of a>b is provided; in which, a represents a width of the base plate through-hole at the first base plate surface in the circumferential direction; and b represents a distance at the second partition surface and in the circumferential direction between a first intersection of the second linear flat surface of the first through-hole with the second partition surface and a second intersection of the first linear flat surface of the second through-hole with the second partition surface.

8. The blower as claimed in claim 7, wherein a geometrical relationship of c>a is provided in which c represents a distance at the second partition surface and in the circumferential direction between a third intersection of the first linear flat surface of the first through-hole with the second partition surface and the first intersection.

* * * * *